March 29, 1927. 1,622,296

F. THORNTON

TROLLEY WHEEL

Filed July 31, 1925

Inventor

Frederick Thornton.

By Emery, Booth, Janney & Varney his Attorneys.

Patented Mar. 29, 1927.

1,622,296

UNITED STATES PATENT OFFICE.

FREDERICK THORNTON, OF HUNTINGTON, WEST VIRGINIA.

TROLLEY WHEEL.

Continuation in part of application Serial No. 598,813, filed November 3, 1922. This application filed July 31, 1925. Serial No. 47,251.

My invention aims to provide an improved trolley wheel for electric railways, and this application is in part a continuation of my prior application, Serial No. 598,813, filed November 3, 1922, entitled "Ball bearing structure for trolley wheels".

In the accompanying drawings wherein I have shown one illustrative embodiment of my invention:

In the illustrative embodiment of my invention my improved wheel comprises a grooved rim 10 of copper detachably secured between two plates or discs 11 (Fig. 2) illustrated herein by bolts, so that the rim may be removed and replaced by a new one when it becomes worn.

Figure 1:
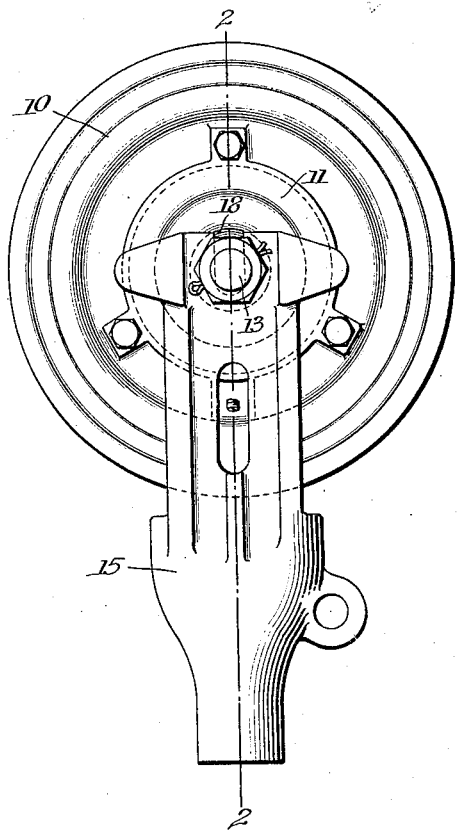
Fig. 1 is a side elevation of my improved wheel mounted on a harp.
Figure 2:
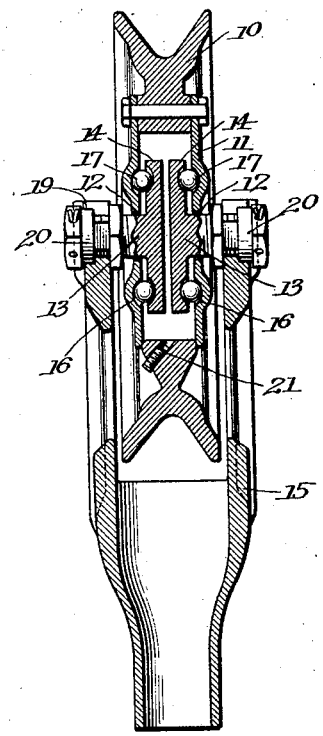
Fig. 2 is a sectional view taken on the line 2—2 of Fig. 1.
Figure 3:
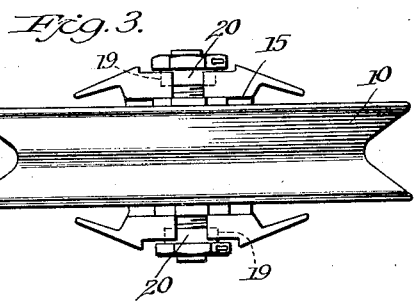
Fig. 3 is a top plan view of Fig. 1.

I utilize the plates 11 to provide an improved semi-floating, anti-friction, side-thrust bearing for my wheel and to this end I have here shown them as having axially aligned openings 12 for stub shafts or axles 13 having integral race members 14 in the space between the plates 11, each of the stub shafts having provision to be secured adjustably in axial alignment on the respective arms of the harp 15. These race members and stub shafts are preferably made of steel drop-forgings and machined to proper size. The inner walls or faces of the plates 11 and the outer faces of the race members 14 are provided with complemental raceways 16, illustrated herein in the form of annular grooves, those in the plates 11 preferably being stamped out as best shown in Fig. 2 and anti-friction rollers for example the balls 17 are placed in the races.

To insure more perfect electrical contact between the balls and the races under running conditions and to reduce friction, I prefer to form the races of such shape as to produce a wedging action on the balls and to present point contact at opposite ends of the diameter of the balls instead of line contacts spaced around a part of their surfaces. To this end I have shown the races as being partly circular in cross section, each having a portion near one edge of greater radius of curvature than that of the other portion and being rounded or convex at the edge, these rounded portions being arranged with one at the inside of one race and the other at the outside of the complemental race (Fig. 2) to provide substantially diagonally disposed bearing portions. By this arrangement the balls can readily adjust themselves to their seats with their points of contact on a line somewhat inclined to the horizontal and will be tightened when they are shifted radially in either direction. Under running conditions any loose balls are thrown outwardly into contact with the races by centrifugal force. I find this is conducive to the long life of the bearings.

To provide for quick and easy attachment of my improved wheel to the harp and to facilitate adjustments of the bearings I have here shown the stub shafts 13 screw threaded for a greater portion of their length, these shafts being long enough to project through opposed slots 18 in the arms of the harp, and they are preferably held securely in alignment and in adjusted position by two nuts, one on the outside of each arm serving to tighten the bearings and the other on the inside of each arm serving as a jamb or locking nut. Herein, I have shown the outer faces of the arms as being counter-bored at 19 near the bottom of the slots 18 and each of the outer nuts has an annular boss 20 machined on it to fit in these counter-bores so that when the nuts are tightened, these bosses will effectively prevent the shafts from slipping out of the slots. To prevent turning movement of the shafts within the slots they are preferably flattened on opposite sides.

To afford means to lubricate my bearing I provide an opening 21 in the rim leading to the closed bearing space and for convenience I have shown an ordinary screw plug closure for this opening. The space around the bearing should be filled at long intervals with soft grease. The tendency for the grease to escape through the openings 12 in the plates around the shafts will be prevented by centrifugal force when the wheel is in use and becomes heated.

If my bearings become unduly worn, it is only necessary to loosen one of the jamb nuts on the shafts and tighten the outer nut until all play has been eliminated. Then the jamb nut is again tightened against the inside of the arm. The inherent resiliency of the arms of the harp is utilized by this construction to keep the bearings tight and thereby to compensate for some wear.

Now, assuming that the various parts of my improved construction are ready to be assembled, the balls are placed in their races and the plates are secured to the rim 10 of the wheel. The thickness of the inner race members 14 is such that the balls cannot escape if these members are pushed together. The jamb nuts are screwed on the shafts and the wheel is ready to be mounted on the harp in the manner hereinbefore described.

My improved wheel is made of considerably greater diameter than that of the wheels generally in use thereby reducing the rate of wear both on the bearings and on trolley wires. Moreover, the weight of copper employed in one of my wheels of nearly twice the groove diameter of an ordinary solid copper wheel is less than that of the small wheel, making replacement costs much less. One of my improved bearings will withstand wear many months longer than the bearings of ordinary wheels and eliminates the necessity for bushings and the like. Further, the installation and maintenance of my wheels do not require the service of a skilled mechanic and the costs for inspections and repairs are greatly reduced.

Having thus described one illustrative embodiment of my invention without in any way limiting myself thereto, what I claim and desire to secure by Letters Patent is:

1. A bearing for trolley wheels comprising, in combination, a wheel rim having discs secured to the opposite sides thereof, said discs presenting lateral grooves providing annular raceways on their inner faces, a pair of separate non-rotatable race members arranged between said discs, each presenting a lateral groove providing annular raceway complemental to the raceway in one of said discs and balls arranged in said complemental raceways to provide side-thrust anti-friction bearings for the wheel.

2. A bearing for trolley wheels comprising, in combination, a wheel rim having removable radial discs secured to its opposite sides, each presenting a lateral raceway in its inner face, separate stationary race members arranged between said radial discs and presenting lateral raceways complemental to the respective raceways in said discs, balls in said raceways and means to secure the inner race members in fixed relation to the harp.

3. A trolley wheel having a pair of side-thrust ball bearings, the raceways for the balls on the side faces of the bearing members and being shaped to provide for two-point contact with the balls and to permit radial shifting of the balls in either direction whereby to tighten them and to maintain such point contact under operating conditions.

4. A trolley wheel bearing comprising axially aligned, oppositely disposed side thrust bearing members having lateral grooves on their side faces, wheel bearing members in axial alignment with said side thrust bearing members and having similar lateral grooves on their side faces arranged in juxtaposition to said side thrust bearing members to provide raceways therebetween and a circular series of balls in each raceway arranged to move radially within said grooves to maintain lateral contact therewith under operating conditions.

5. A trolley wheel installation comprising a pair of aligned stub shafts adjustably secured to the harp, integral discs presenting lateral raceways on the shafts, a wheel presenting cooperating lateral race members and anti-friction rollers in the races.

6. A trolley wheel comprising a wheel rim, a pair of plates removably secured to the sides of the rim and having axially aligned openings and annular raceways, stub shafts projecting through said openings and presenting discs between said plates having lateral races complemental to the races in said plates, balls in said races and means adjustably securing said shafts to a harp whereby to tighten the bearings.

7. A bearing for trolley wheels comprising a pair of aligned stub shafts, each presenting threaded ends to be adjustably secured in fixed relation to the arms of a harp and having integral race members at their inner ends, races in said race members, a wheel rim carrying race members complemental to the first named race members and anti-friction bearing elements in said races, said races being spaced from the periphery of said shafts.

8. A trolley wheel comprising a grooved wheel rim, a pair of radial discs secured to the sides of said rim each having a depressed annular raceway in its inner face, stationary race members housed between said plates and presenting lateral raceways complemental to the respective raceways in said discs and anti-friction bearing elements in said raceways.

In testimony whereof, I have signed my name to this specification.

FREDERICK THORNTON.